Oct. 11, 1966

P. J. RIEPPEL ETAL 3,277,567

METHOD FOR FORMING GIRTH WELDS BETWEEN
LARGE TUBULAR METAL SECTIONS

Original Filed Oct. 26, 1961

Perry J. Rieppel, Glenn E. Faulkner,
Jerome W. Nelson & Harry C. Cook INVENTORS

BY David F. Walters

PATENT ATTORNEY

Oct. 11, 1966

P. J. RIEPPEL ET AL 3,277,567

METHOD FOR FORMING GIRTH WELDS BETWEEN
LARGE TUBULAR METAL SECTIONS

Original Filed Oct. 26, 1961

Perry J. Rieppel, Glenn E. Faulkner,
Jerome W. Nelson & Harry C. Cook    INVENTORS BY *Donald F. Worlelas*

PATENT ATTORNEY

Oct. 11, 1966   P. J. RIEPPEL ETAL   3,277,567
METHOD FOR FORMING GIRTH WELDS BETWEEN
LARGE TUBULAR METAL SECTIONS
Original Filed Oct. 26, 1961   4 Sheets-Sheet 3

Perry J. Rieppel, Glenn E. Faulkner,
Jerome W. Nelson & Harry C. Cook   INVENTORS BY Donald F. Ceshelis
PATENT ATTORNEY Oct. 11, 1966 P. J. RIEPPEL ETAL 3,277,567
METHOD FOR FORMING GIRTH WELDS BETWEEN
LARGE TUBULAR METAL SECTIONS
Original Filed Oct. 26, 1961 4 Sheets-Sheet 4

Perry J. Rieppel, Glenn E. Faulkner,
Jerome W. Nelson & Harry C. Cook   INVENTORS BY Donald F. Coolidge
PATENT ATTORNEY

United States Patent Office 3,277,567
Patented Oct. 11, 1966

3,277,567
METHOD FOR FORMING GIRTH WELDS BETWEEN LARGE TUBULAR METAL SECTIONS
Perry J. Rieppel, Worthington, and Glenn E. Faulkner and Jerome W. Nelson, Columbus, Ohio, and Harry C. Cook, Orange, N.J., assignors to Esso Research and Engineering Company, Elizabeth, N.J., a corporation of Delaware
Original application Oct. 26, 1961, Ser. No. 147,850. Divided and this application Mar. 3, 1965, Ser. No. 446,447
3 Claims. (Cl. 29—482)

This is a division of application Serial No. 147,850 filed October 26, 1961, now Patent No. 3,188,445.

The present invention relates to a method and apparatus for forming girth welds between adjoining sections of large tubular materials such as pipe line sections of large diameter. The invention has particular application to the welding of pipe lines in the field, especially pipe lines of diameter greater than about 16 inches, especially 24 inches and larger. It can be adapted, however, to the welding of other tubular elements and structures of analogous types.

In the prior art various attempts have been made to weld pipe lines in the field by automatic methods, but in general these have not been successful. Recently certain improvements have been made whereby automatic or semi-automatic operations have been successfully conducted in the field to form girth welds, but these have not been as efficient as is desirable. One type of welding operation which has been relatively successful involves the preliminary preparation of a precisely dimensioned space between the pipe sections which are brought in end-to-end relationship. The forming of this closely controlled space is followed by welding. In many types of pipe the welding may be accomplished at a single pass operation, greatly reducing the time and cost of forming such welds. Even in thick wall pipe, a major part may be accomplished at a single pass.

In operations of this type in the past, however, it has been necessary to perform first a substantial part of the preparation step, such as cutting around a large arc, after which the preparation is stopped and the welding ensues. The welding is then stopped, a further preparation operation is carried out around a further segment of pipe circumference; this further preparation is then stopped, further welding is carried out around the part of the circumference just prepared, and the process is continued stepwise until a complete joint is formed. It will be appreciated that in the type of operation just described, all of the equipment is idle at least half of the time and usually more, even after the apparatus has been set up and the operation is completely ready.

In the welding of relatively small pipe lines, the preparation step, particularly where it involves cutting a thin groove between abutting pipe ends, is preferably carried out around at least half of the pipe periphery. The half which has been cut is then welded, the other half is next cut in an opposite direction circumferentially, and finally the second half is welded. This type of operation has been found to be quite satisfactory.

For large diameter pipe lines, however, the stresses due to cooling and shrinkage set up by reason of the freshly made weld tend to work against the cutting operation, breaking the cutting disc, etc. Also the relatively long operating or return travel required during and between the several operations of cutting, welding, and bringing equipment into position for the next step is quite time-consuming and inefficient. It is an object of the present invention to reduce the over-all time and substantially improve efficiency by a new mode of operation wherein at least some of the preparatory and welding steps may be overlapped instead of being performed sequentially.

A further object involves a design of apparatus which can move about the pipe circumference in orbital fashion, or relatively thereto (since the pipe may be rotated and the equipment held stationary for some purposes), with one or more welding heads mounted in such a manner as to follow the cutting or preparation device regardless of the direction of rotation or orbit. This is accomplished by mounting the preparatory device, hereinafter generally referred to as a cutter, in a mid-portion of the mounting means such as an orbital carriage, and mounting two or more welding heads on the same mounting means, one head (or set of heads where multiple pass welding is desired) being ahead of the cutter and the other head or set behind it. With this equipment, most of the operations may be carried out in either direction around the joint with the preparatory or cutting operation preceding the welding regardless of the direction of rotation or orbital travel with respect to the pipe.

Alternatively, the welding equipment may be supported on separate or relatively movable mounting means which can be moved on the basic mount or carriage so as to place the welding device behind the cutting or preparatory device regardless of the direction of rotation or relative motion about the pipe.

Other objects involve the general improvement of efficiency to minimize total operating time of the equipment. These will appear more fully as the description proceeds.

Therefore, reference will next be made to the accompanying drawings wherein.

Figure 1:
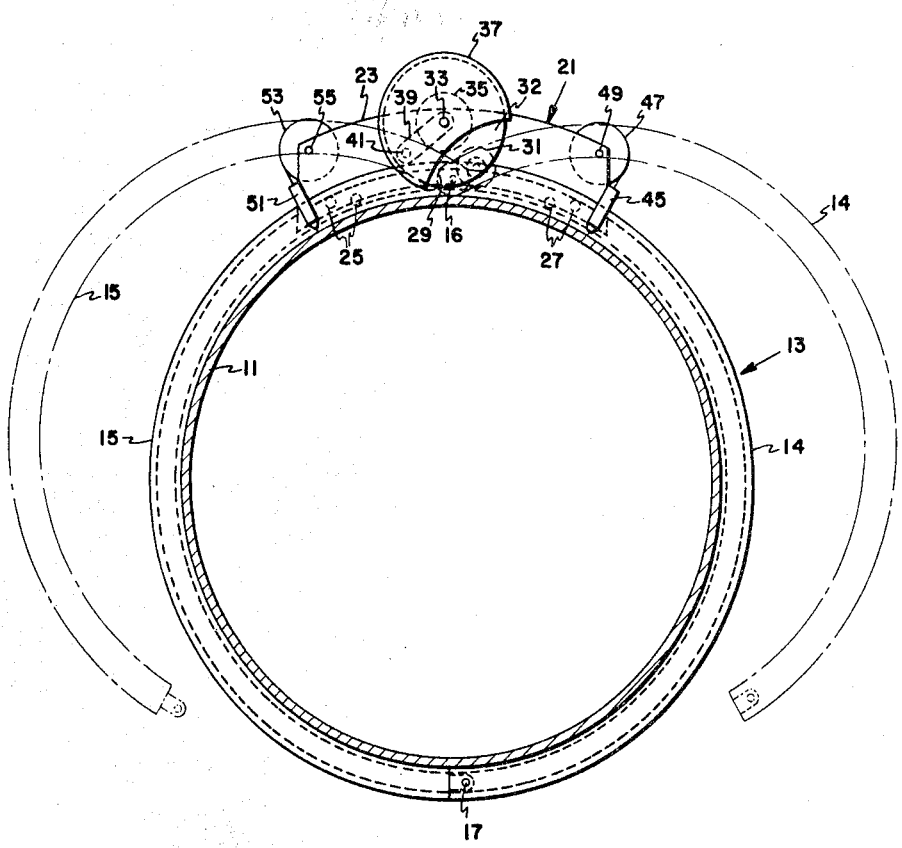
FIG. 1 is a general and somewhat diagrammatic elevational view of a section of pipe carrying a demountable supporting track and one form of operating apparatus according to the present invention.

Referring first to FIG. 1, there is disclosed an end view of a pipe section 11, surrounded by an annular track structure 13 which is composed of a plurality of segments 14, 15 which are relatively movable about a pivot point or jointure 16. Their opposite ends can be joined together at a locking point 17 to hold the track in position around the pipe. Suitable tightening and holding means are provided but these are not shown since they form the subject matter of other applications and are not essential parts of the present invention. Further details of the equipment of the type just mentioned are disclosed in a co-pending application by Nelson, Faulkner and Cook, Serial No. 145,307, filed October 26, 1961, now Patent No. 3,195,245, as well as an earlier application by Rieppel and the same inventors, Serial No. 60,684, filed October 5, 1960, now Patent No. 3,084,244.

The equipment mentioned above is positioned on the pipe line 11 in predetermined relationship with respect to the welded joint which is to be formed. It is adapted to support and control the travel or relative movement about the pipe periphery of a carriage structure 21. This carriage is equipped with reversible self-propelling means, so that it can travel in orbital or planetary fashion around the pipe line in either direction. The carriage details may be varied considerably and several different modifications have been shown in the co-pending applications referred to above. In the form shown in FIG. 1, the carriage consists of a body member 23 having guide rollers 25, 27, a drive wheel or gear 29, and a driving motor 31 suitably connected to the drive wheel. In the mid-portion of the carriage there is mounted a cutting device which comprises a cutting wheel 32 adapted to be driven at high speed around its axle 33 by means of a drive motor 35. A shield 37 serves as a cover or guard for the wheel and is mounted concentrically therewith. All of these parts are supported by a pivoted arm 39 mounted on a pivot support 41 secured to the frame 23. Hence the cutting wheel can be swung towards or away from the pipe at any carriage position.

On either end of the carriage 23 there is mounted a welding head 45, 51. Equipment is provided also for feeding welding wire or equivalent material to the welding head and necessary connections, obvious to those skilled in the art and shown in detail in the co-pending applications mentioned above, provide electric current, shielding gas, cooling water, etc. to the electrodes or welding heads. The welding head 45 at the right receives electrode wire from a reel 47 pivotally mounted at 49 in the frame, and is adapted to follow the cutter in counterclockwise rotation of the carriage about the pipe axis. Similarly, the electrode or welding head 51 at the left receives welding wire from a reel 53 supported at 55 in the frame, this unit being adapted to follow the cutter in clockwise rotation.

The track structure 13 may be removed from the pipe line by unlocking the connection 17 and swinging apart the relatively movable segments 14 and 15. The carriage is also demountable from the track equipment, details of this being also shown in the co-pending application.

Figure 2:
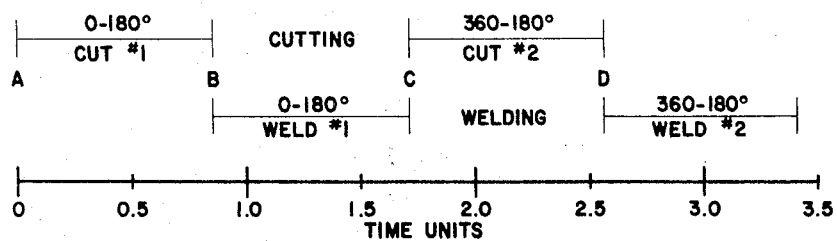
FIG. 2 is a time chart showing an arrangement whereby "dead" time between operations is substantially eliminated.
Figure 3:
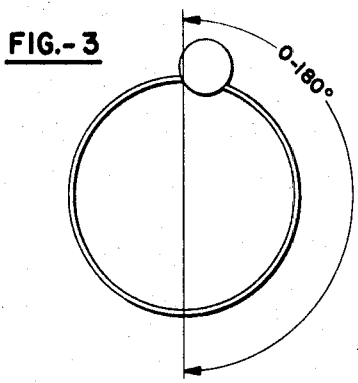
FIGS. 3 and 4 are diagrammatic views showing relative arrangements and timing of cutting and welding operations to approach the timing of FIG. 2.
Figure 4:
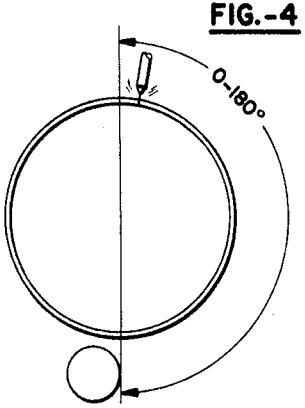

Now referring to FIG. 2, assume that a welding head and a preparatory device, specifically a cutter, analogous to those of FIG. 1, are mounted diametrically opposite each other across the axis of the pipe line. This would involve either separate carriages for cutter and welder or else a carriage which extends at least 180 degrees around the pipe periphery. With one of these arrangements, assuming that a cutting operation is started first and carried out for 180 degrees, at the completion of the cutting the welder would be substantially in position to begin its operation along the fresh cut portion of the pipe circumference. With precise timing, the cutting may be discontinued at 180 degrees from the top of the pipe as shown in FIG. 4, and welding can commence at the same instant. On completion of the 180 degree weld, the cutter, which has moved idly around the joint, would be again positioned at the top.

Figure 5:
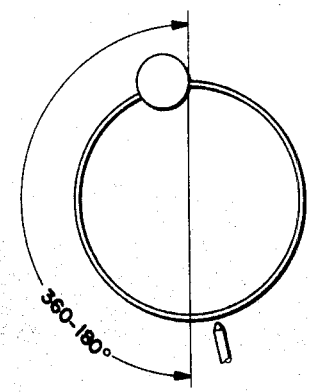
FIGS. 5 and 6 illustrate further operations to complete the work started in FIGS. 3 and 4.
Figure 6:
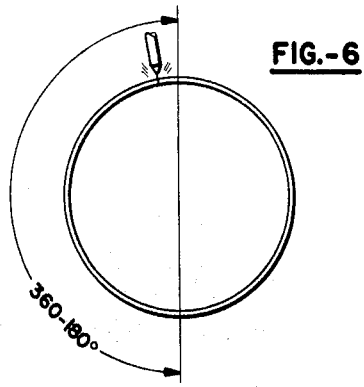

The operation is now reversed to start cutting from the top in a counterclockwise direction, FIG. 5, the welder traveling idly to the top of the pipe as the cutter proceeds to the bottom. Finally, the welding proceeds counterclockwise from top to bottom, the sequence being A, B, C and D, FIG. 2. Assuming that each of these operations consumes about 0.85 time unit (on a pipe of a certain size, the time units would be in minutes; but on other pipes, might change), the total time for a complete cycle would be about 3.4 time units.

It should be explained that due to considerations of gravity, flow of molten metal, capillary forces and surface tension effects in the narrow welded joint, welding preferably should proceed from top to bottom and not vice versa. This requires that operations be planned so that welding can always proceed in the preferred direction regardless of other considerations. The operation shown in FIGS. 2 to 6, inclusive is a highly efficient one, there being little or no dead time from start to finish. This is suitable where the operative devices, the cutter and the welding head, can conveniently be positioned approximately 180 degrees apart. This positioning is sometimes inconvenient or it may require unduly heavy and complex equipment.

Figure 7:
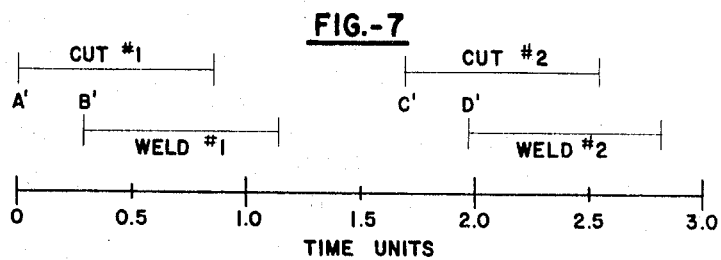
FIG. 7 is another time chart showing a modified arrangement wherein some of the active operations are substantially overlapped and a reduction in total time accomplished, even though there is some dead time between other operations.
Figure 8:
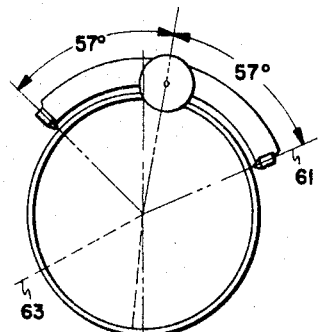
FIG. 8 is a diagrammatic view of a system involving a cutting device positioned substantially mid-way between two welder devices on the same supporting mechanism to permit operations in either direction. The sequence possible with the system here shown corresponds to that of FIG. 7.

Referring to FIG. 7, a sequence of operations is shown wherein a first cut clockwise, top to bottom, is made commencing at time 0, and welding (at the top, FIG. 8) ensues a very short time thereafter. With the equipment of FIG. 1, such operations are possible. After the cutting has progressed a certain distance as indicated by the line 61, FIG. 8, welding is proceeding as shown by the relative time spacing of points A' and B', FIG. 7. The cutting to the bottom of the joint is completed at about 0.85 time units, and the welding of the first half is completed at approximately 1.12 time units. At this point the cutter has reached the approximate position of dotted line 63, FIG. 8, and must travel the remaining distance to the top of the pipe before a new cutting operation can be started. Hence, there is a dead time until point C' is reached at about 1.69 time units. The travel direction is now reversed and the cutter proceeds counterclockwise, followed by the welder which commences at point D', the entire operation being completed in about 2.8 time units. This represents a substantial reduction in time as compared with FIG. 2, but it involves the provision of a more complex carriage structure so arranged and equipped that a welding head can follow the cutter in either direction.

Figure 9:
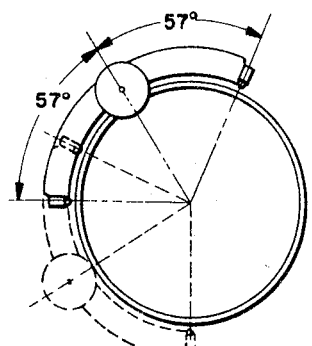
FIG. 9 illustrates another sequence using the same equipment as in FIG. 8.

Referring to FIG. 9, the relationship between the parts at completion of the first half cycle and commencement of the second half cycle respectively are shown in dotted lines and full lines respectively. Welding head $W_1$ has completed the first half weld. Head $W_2$ moves to a point just to the right of the top preparatory to clockwise welding of the left half of the joint.

Figure 10:
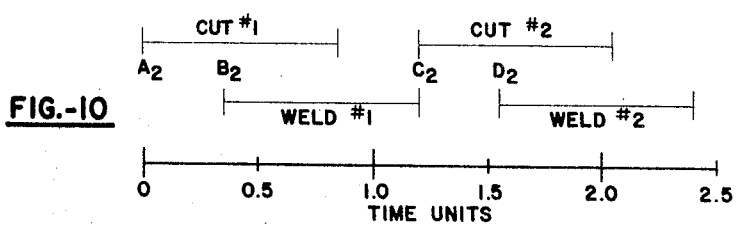
FIG. 10 illustrates the overlapping of operations with substantial elemination of dead time so as to effect a further reduction in over-all time required for a complete joint welding operation.

FIG. 10 shows a further improvement in timing which can be accomplished only if there is substantially no "dead" time involved in bringing either the cutter or the welder to starting position for the second half cycle. This requires either an arrangement whereby the relative position between welder and cutter may be shifted around the circumference, or else requires two separate assemblies. With this arrangement, cutting starts at time $A_2$, welding at time $B_2$, the second half cycle starts at $C_2$ which coincides substantially with the termination of the first operation welding time, and finally the welding for the second half cycle starts at $D_2$, the total time requirement being now reduced to about 2.4 units.

Figure 11:
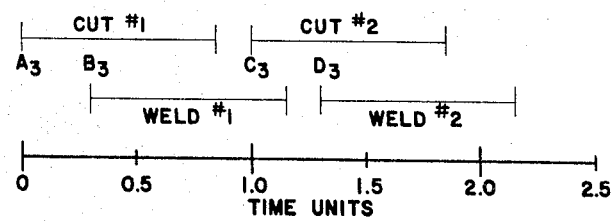
FIG. 11 represents a time chart for a further system wherein both the cutting means and the welding means are duplicated to accomplish a still further over-all time reduction.

Now, referring to FIG. 11, by the use of two separately mounted cutting devices and two separate welding heads, the time may further be reduced to a point approaching absolute minimum. Equipment requirements of course are somewhat more complex. The cutter must, of course, always get far enough ahead of the welder to get out of its way. Inasmuch as the commercially available cutting wheels are of relatively large diameter, this involves a time lag of at least about 0.2 to 0.3 time units. Moreover, unless clamping means are exceptionally heavy and rigid, which is difficult to provide, the welding head must be far enough behind the cutter that the solidifying weld, shrinking as it cools, does not partially close the gap on the wheel and cause breakage. In FIG. 11, the first half cycle starts at $A_3$, followed by welding as closely behind as is mechanically feasible with space limitations imposed by the apparatus. Welding operation No. 1 starts at point $B_3$, the second cutting cycle at $C_3$, and then the second or final welding cycle at $D_3$. As shown, the whole operation is completed in about 2.15 time units. This has the disadvantage of requiring somewhat more costly equipment than the arrangements of FIGS. 2 and 7.

Figure 12:
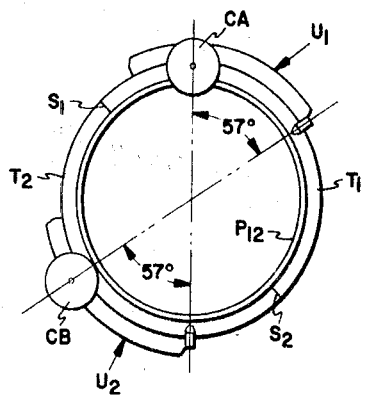
FIG. 12 illustrates a system having two complete opertive units moving about the same axis.

FIG. 12 shows diagrammatically an efficient system wherein two relatively movable and separate cutting and welding units $U_1$ and $U_2$ are removably mounted on a sectional track consisting or relatively movable parts $T_1$ and $T_2$. These are separable at points $S_1$ and $S_2$. In ordinary use, the two units are positioned substantially diametrically opposite each other. Assume that the cutter CA of $U_1$ is beginning its operation counterclockwise, the idle cutter CB of $U_2$ is moving also counterclockwise preparatory to making the second half cut, from the top clockwise to the bottom of pipe $P_{12}$.

Figure 14:
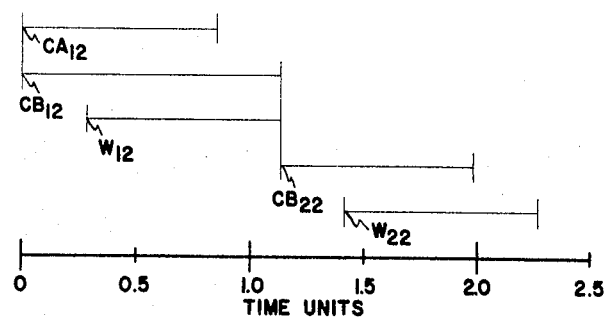
FIG. 14 is a time chart of a typical operation of the system of FIG. 12.

As cutter CA proceeds ($CA_{12}$, FIG. 14), is associated welder moves into position to begin welding the freshly cut kerf. Welding commences at point $W_{12}$, FIG. 14. The idle movement of cutter CB is indicated at $CB_{12}$. Since CB is more than 180° behind CA, operation $CB_{12}$ is longer than cutting operation $CA_{12}$.

The first welding step is completed about 57° of arc after the first cut. Meantime the second cutting operation $CB_{22}$ has started at the top, running clockwise. It is followed 57° of arc later by the second welding operation $W_{22}$. It will be noted that the welding operations preferably do not overlap. If they did, they would need double welding power during the time of overlap which would probably require additional expensive generating equipment.

Many pipe welding procedures can be accomplished at a single pass and this is perferred where possible. However, for heavy wall pipe, two or more passes may be necessary.

Figure 13:
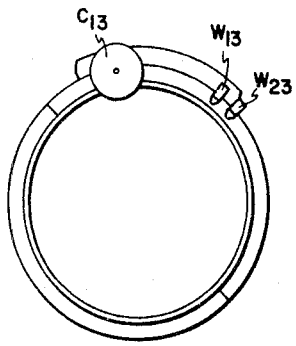
FIG. 13 is a similar system with tandem welders for multiple pass operation.

FIG. 13 shows an arrangement for multiple pass welding. Here a cutter $C_{13}$ is followed by multiple welding heads $W_{13}$, $W_{23}$, all mounted on the same carriage. Obviously two such units can be used if desired, as in FIG. 12, or a single carriage can have multiple welding heads on each end where reversability is desired, as in FIGS. 1, 8 and 9. The phasing of operations depends on the available equipment. This will be evident by comparing FIGS. 2, 7, 10, 11 and 14. The time requirement for a complete girth weld, however, is always reduced to a practical minimum, consistent with the equipment available. The principles of the invention thus are applicable to various combinations of equipment, including variations not shown as well as those illustrated and described herein.

In summary, the present invention involves in its method aspects the concept of forming girth welds between large tubular sections of metal in a minimum of time. The operations comprise bringing the sections substantially into end abutting positions, clamping them in position, and then cutting a precisely predetermined kerf, i.e., precise in its width, between the sections. After this cut has proceeded for a suitable distance, not substantially exceeding 180 degrees in some of the cases shown and, in some of the preferred modifications comprising only a minor part of the periphery, the welder is brought into operation. If the spacing between the welder and the cutter is less than 180 degrees, cutting continues simultaneously with welding until the cutter has passed the 180 degree point (the bottom of the pipe in normal operations). The cutting operation now switches to the top of the pipe and swings in the reverse direction from the first half cycle, being followed by welding which overlaps the cutting operation or is contemporaneous with part thereof if the spacing between cutter and welder is less than 180 degrees. It will be understood that in large pipes, unit operations may desirably be much less than 180° in many cases.

Thus, the invention contemplates operation (a) wherein there is a substantial reduction in dead time between half cycles, (b) operations wherein there is an overlap between cutting and welding which more than compensates for any dead time between half cycles, and (c) operations wherein multiple equipment substantially eliminates dead time. In its presently preferred form the method involves the substantial elimination of dead time by use of a minimum of duplicate equipment, combined with overlapping between cutting and welding operations so as further to reduce the time requirements for a full cycle operation.

In its apparatus aspects, the invention involves flexible combinations of equipment comprising a suitable support such as a guide track and carriage means adapted to travel around the said track in either direction. It further contemplates the relative positioning of the preparatory device, i.e., the cutting wheel, and the welding head or heads so as to minimize dead time and maximize the overlapping of operations, consistent with economy of overall equipment. In one specifically preferred form, which combines some advantages of simplicity of apparatus and time reduction, the apparatus aspects comprise a supporting device carrying the preparatory device, cutter or the like in or on its mid-portion, and a welding device mounted towards either end of the carriage, one on each side of the preparatory device so that regardless of direction of relative movement between the operating equipment and the joint periphery, the welding element can always follow fairly closely behind the cutter or other preparatory device.

It will be understood that reference above to the welding of pipe lines is intended to be generic to the welding of various tubular structures of fairly large diameter, regardless whether they are incorporated in pipe lines or in other equipment. Thus the welding of sections of cylindrical tanks and the like obviously may be accomplished in similar fashion.

It is also contemplated in general terms that other operations rather than the specific cutting operation may be used for forming the precise narrow space or groove required for single pass welding. It is further contemplated that although single pass welding is preferred, or two pass welding in one form illustrated, the invention may be applied to joints and weldments wherein supplementary filling operations may be necessary. For example, on standard 0.280 inch pipe, single pass operations of high quality are regularly performed. On pipe welds of greater thickness, a single pass operation becomes increasingly difficult and on 0.375 inch pipe walls one supplemental filler operation may be required. On other materials, additional operations may be needed. Hence in this description and in some of the claims which follow, it is intended that such terms as "substantial completion" of a weld at a single pass involves the concept of performing the most important or a major part of a weldment at a single pass whether or not subsequent filling and finishing operations, manual or mechanical, may be required.

It will be understood also that various modifications may be made within the spirit of the invention without departing from its concept. Within the limits permitted by the prior art, it is intended to cover such modifications as would occur to those skilled in the art.

What is claimed is:

1. The method of forming girth welds between horizontal tubular sections of pipe comprising the steps of bringing said sections of pipe into substantially end to end abutting relationship, cutting a precisely predetermined width first kerf in one rotational direction between the abutting ends of said pipe sections starting from a top portion of said pipe around a first substantially semicircular part of their joining periphery with a first cutting means, welding in said direction progressively along said first kerf while continuing said cutting about said first semicircular kerf with a first welding means, cutting a precisely predetermined width second kerf in the opposite rotational direction in alignment with said first kerf starting from the top portion of said pipe around a second substantially semicircular part of their adjoining periphery with a second cutting means, and welding in said opposite direction progressively along said second kerf while continuing said cutting about said second semicircular kerf with a second welding means whereby the total cutting and welding time is substantially reduced below that required for normal sequential cutting and welding operations.

2. The method of claim 1 wherein the step of welding the first and second kerfs include filling the depth of each kerf by making two successive welding passes.

3. The method of forming girth welds between horizontal tubular sections of pipe comprising the steps of bringing said sections of pipe into substantially end to end abutting and aligned relationship, commencing to cut a precisely predetermined width first kerf in one rotational direction between the abutting ends of said pipe sections starting from a top portion of said pipe around a first substantially semicircular part of their joining periphery, initiating a welding operation in said direction progressively along said first kerf while continuing said cutting about said first semicircular kerf, commencing to cut a precisely predetermined width second kerf in the opposite rotational direction in alignment with said first kerf starting from the top portion of said pipe around a second substantially semicircular part of their adjoining periphery during the welding of said first kerf, and welding in said opposite direction progressively along said second kerf while continuing said cutting about said second semicircular kerf whereby the total cutting and welding time is substantially reduced below that required for normal sequential cutting and welding operations.

References Cited by the Examiner

UNITED STATES PATENTS

| | | | |
|---|---|---|---|
| 3,084,244 | 4/1963 | Rieppel et al. | 219—60.1 X |
| 3,084,246 | 4/1963 | Rieppel et al. | 219—60.1 X |
| 3,126,471 | 3/1964 | Nelson | 219—60.1 |

JOHN F. CAMPBELL, *Primary Examiner.*